US009271476B1

(12) United States Patent
Flynn

(10) Patent No.: US 9,271,476 B1
(45) Date of Patent: Mar. 1, 2016

(54) CONVERTIBLE AND SIZE ADAPTABLE DOG LEAD

(71) Applicant: Lisa B. Flynn, Beach Haven, NJ (US)

(72) Inventor: Lisa B. Flynn, Beach Haven, NJ (US)

(*) Notice: Subject to any disclaimer, the term of this patent is extended or adjusted under 35 U.S.C. 154(b) by 0 days.

(21) Appl. No.: 14/456,878

(22) Filed: Aug. 11, 2014

Related U.S. Application Data

(63) Continuation-in-part of application No. 13/554,355, filed on Jul. 20, 2012, now abandoned, and a continuation-in-part of application No. 13/305,093, filed on Nov. 28, 2011, now abandoned.

(51) Int. Cl.
A01K 27/00 (2006.01)

(52) U.S. Cl.
CPC ............ *A01K 27/003* (2013.01); *A01K 27/001* (2013.01); *A01K 27/002* (2013.01)

(58) Field of Classification Search
CPC .... A01K 27/002; A01K 27/003; A01K 27/00
USPC .......................................................... 119/792
See application file for complete search history.

(56) References Cited

U.S. PATENT DOCUMENTS

| 3,752,127 | A  | * | 8/1973  | Baker ........................... 119/797 |
| 5,791,295 | A  | * | 8/1998  | Schmid et al. ................ 119/793 |
| 5,934,224 | A  | * | 8/1999  | Sporn ........................... 119/792 |
| 6,397,784 | B1 | * | 6/2002  | Morgan-Albertson et al. .............................. 119/792 |
| 6,708,650 | B1 | * | 3/2004  | Yates ............................ 119/792 |
| 8,100,090 | B1 | * | 1/2012  | Sutter .......................... 119/793 |
| 2008/0134989 | A1 | * | 6/2008  | Weiss ............................ 119/793 |
| 2010/0294212 | A1 | * | 11/2010 | Therrian ....................... 119/793 |
| 2011/0083616 | A1 | * | 4/2011  | Elkins et al. ................. 119/792 |
| 2011/0203532 | A1 | * | 8/2011  | Edlin et al. .................... 119/792 |
| 2013/0074782 | A1 | * | 3/2013  | Marran ......................... 119/793 |

* cited by examiner

*Primary Examiner* — Monica Williams
*Assistant Examiner* — Jessica Wong
(74) *Attorney, Agent, or Firm* — Michael R. Philips

(57) ABSTRACT

In first, second, and third embodiments of the invention the dog lead is formed from a cord and has a first loop and a second loop at one end and a handle at the other end. The handle and a portion of the cord are passed through the first loop to form a collar. The handle and an additional portion of the cord are then passed under the dog's chest and through the second loop to form a chest band. In a fourth embodiment of the invention, a stop is mounted snugly on the cord and a washer is mounted to the cord. In a fifth embodiment of the invention, an inner stop and a outer stop are provided on both sides of a ring to keep the collar from becoming tight or loose, making the dog lead virtually escape proof.

7 Claims, 7 Drawing Sheets

CONVERTIBLE AND SIZE ADAPTABLE DOG LEAD

RELATED APPLICATION

This application is a continuation-in-part of application Ser. No. 13/554,355 filed Jul. 20, 2012 which is a continuation-in-part of application Ser. No. 13/305,093 filed Nov. 28, 2011.

FIELD OF THE INVENTION

The present invention relates to the field of leads for handling and walking dogs, and more particularly to a lead that may be converted from a collar with an integral leash to a harness with an integral leash.

BACKGROUND OF THE INVENTION

Dogs that are not well leash trained or anxious, or are being walked by an unfamiliar person, are frequently difficult to control. Using a conventional collar and leash is not adequate as the dog may slip out of the collar and escape. A known solution to this problem is to use a slip collar, also known as a choke collar. The slip collar is a length of cord or chain with a loop at a first end and the second end passing through the loop. The second end of the collar is either attached to a lead or may be formed integral with the lead. When a dog pulls on the collar, the collar tightens, and the dog cannot slip out.

The above described condition of unruly or anxious dogs occurs more often in an animal shelter setting where the dogs are from unknown backgrounds and the people caring for the dogs must walk many different dogs every day. Dog shelter workers regularly use a slip collar or a slip lead. While use of the slip collar, i.e. choke collar, on a particularly difficult dog accomplishes the main objective of keeping the collar and lead on the dog, the dog may pull so hard to cause himself or herself choking, pain or injury.

An improved dog handling device that has become popular is the dog harness. A dog harness consists of several straps, one passing around the dog's neck and another passing around the dog's chest, the two straps being connected across the shoulders. The harness provides good control, does not afford the dog the chance of escaping, and does not hurt the dog because the force of pulling is largely applied to the chest area rather than the neck.

While the harness solves the basic problem of controlling a dog during walking, this solution is not practical for people who walk shelter dogs. Putting a harness on an unruly or anxious dog and taking it off at the end of the walk can be difficult and time consuming. If a harness is left on the dog for the time between walks, the dog may attempt to chew it off. Therefore, a dog handling device is needed to provide the security of a slip collar with the comfort of a harness and is quick and easy to put on and take off of the dog.

SUMMARY OF THE INVENTION

The invention disclosed below provides a convertible and size adaptable dog lead to overcome the problems of prior known dog handling devices. The convertible and size adaptable dog lead is formed of a flexible cord having a handle at a first end and a pair of loops at a second end. The cord between the handle and the two loops passes through one of the loops, forming an integral slip collar. The formed slip collar is placed over the head and neck of the dog to be walked and the cord and handle are passed under the dog's chest behind the dog's front legs. The handle is next passed through the second loop and pulled up, creating a harness. The harness formed is adaptable to various sized dogs. When the dog is walked, the portion of the lead around the dog's chest will tighten if the dog attempts to escape. A tight cord around the chest cannot cause as much pain or injury as a tight cord around the neck. According to a second preferred embodiment of the invention, a stop is provided to prevent the collar portion of the dog lead from becoming tight around the neck of the dog, and a flexible washer is provided to prevent the chest portion of the dog lead from becoming too loose. In this manner, the second embodiment further emphasizes both the comfort and the control factors that characterize this invention. The dog is therefore held in control by a lead that can be put on and taken off quickly. The dog lead described herein is size adaptable to accommodate dogs of various sizes. In a further embodiment of the invention, an inner stop and an outer stop are mounted snugly on the cord on either side of the first loop. The stops are positioned closely to the first loop to prevent the collar portion of the dog lead from becoming loose or becoming tight. A flexible washer is mounted snugly on the cord adjacent to the handle. After the handle and the washer are passed under the chest and through the second loop, the washer is positioned adjacent to the second loop to prevent the second loop from becoming loose. The resultant dog lead is virtually escape proof.

BRIEF DESCRIPTION OF THE DRAWINGS

The present invention is best understood in conjunction with the accompanying drawing figures in which like elements are identified by similar reference numerals and wherein.

DETAILED DESCRIPTION OF THE PREFERRED EMBODIMENTS

Figure 1:
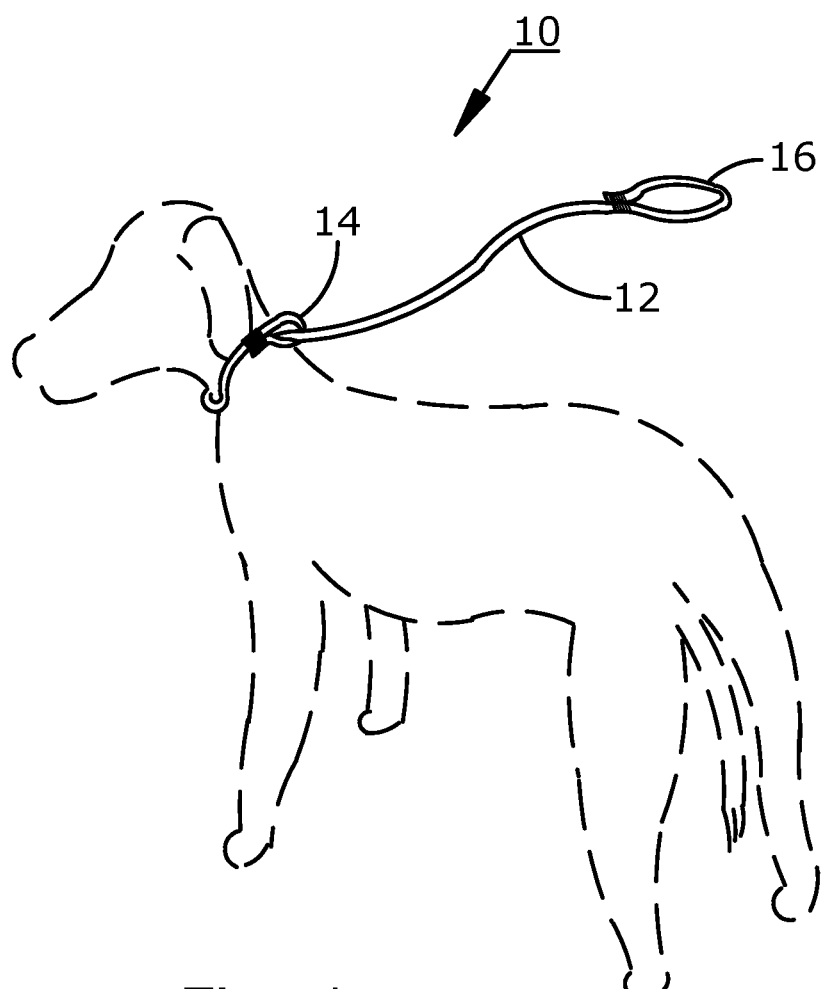
FIG. 1 is a perspective view of a combination slip collar and lead of the prior art worn by a dog, the dog shown in dashed lines for clarity.

Referring to FIG. 1, a combination slip collar and lead 10 according to the prior art is shown attached to a dog. Lead 10 is formed of a flexible cord 12 with a loop 14 formed at a first end and a handle 16 formed at a second end. Cord 12 is passed through loop 14 to form a collar that is placed over the head and onto the neck of the dog shown. When walking the dog, the collar will tighten around the dog's neck if the dog or the dog walker pulls on lead 10, preventing the dog from slipping out of the combination slip collar and lead.

Figure 2:
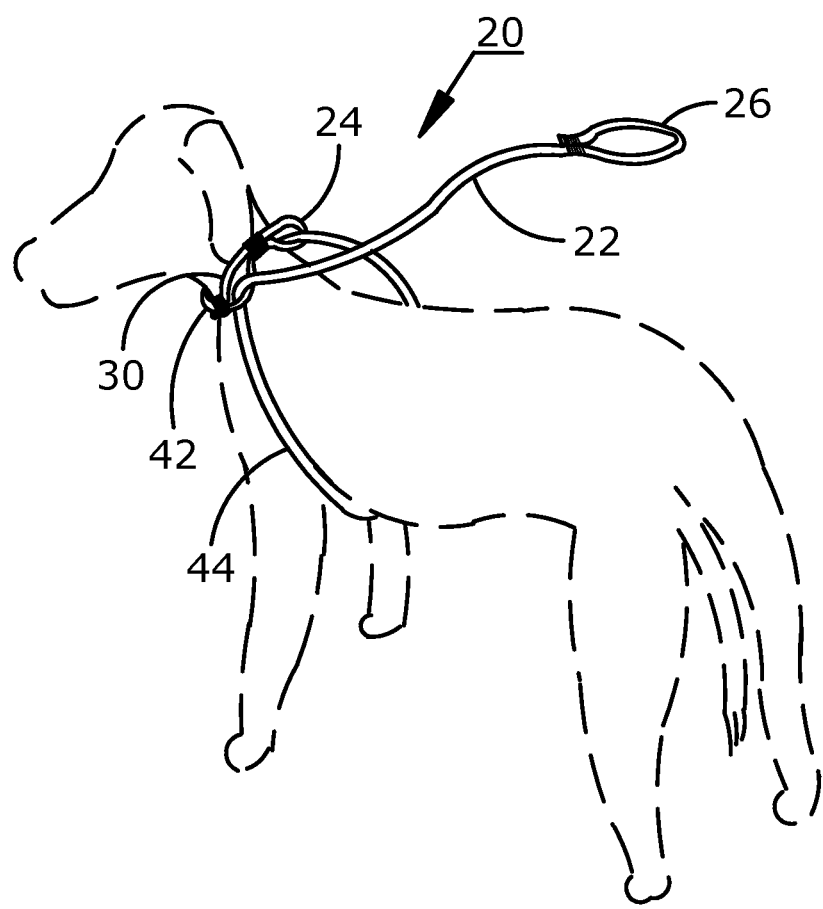
FIG. 2 is a perspective view of a convertible and size adaptable dog lead of the present invention worn by a dog, the dog shown in dashed lines for clarity.

Referring now to FIG. 2, a convertible and size adaptable dog lead 20 of a first embodiment of the present invention is illustrated attached to a dog. Lead 20 is formed of a flexible cord 22 with a first loop 24 formed at a first end and a second loop 30 formed adjacent to first loop 24. A handle 26 is formed at a second end of flexible cord 22. Placing dog lead 20 of the present invention on a dog involves passing cord 22 through first loop 24 to form a slip collar 42 and placing the slip collar over the head and onto the neck of a dog in a manner similar to the prior art slip lead illustrated in FIG. 1. Next handle 26 is passed under the dog's chest behind the dog's front legs and passed through second loop 30 to form a chest band 44. Since both collar 42 and chest band 44 are slip constructions, lead 20 of the invention is adaptable to various size dogs. However, it is not suggested that a lead 20 sized to accommodate a toy breed dog will also fit a mastiff or St. Bernard, therefore different size leads 20 may be produced according to the manufacturer. With the convertible and size adaptable dog lead 20 placed on the dog as shown in FIG. 2, the dog can be well controlled without discomfort or injury due to the lead.

Figure 3A:
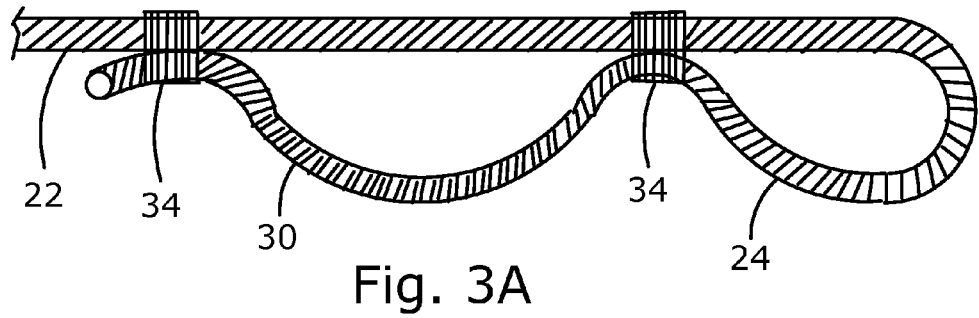
FIG. 3A is an enlarged side elevation view of the collar end of the convertible and size adaptable dog lead according to a first embodiment.

Referring now to FIG. 3A, the collar end of the present invention is illustrated in enlarged side elevation view according to a first preferred embodiment. Flexible cord 22 forms a first loop 24 at a distal end with a second loop 30 adjacent thereto. First loop 24 and second loop 30 are held in loop configuration with a wrap 34, e.g. a layer of thread, plastic or wire wound tightly around the two sections of cord 22.

Figure 3B:
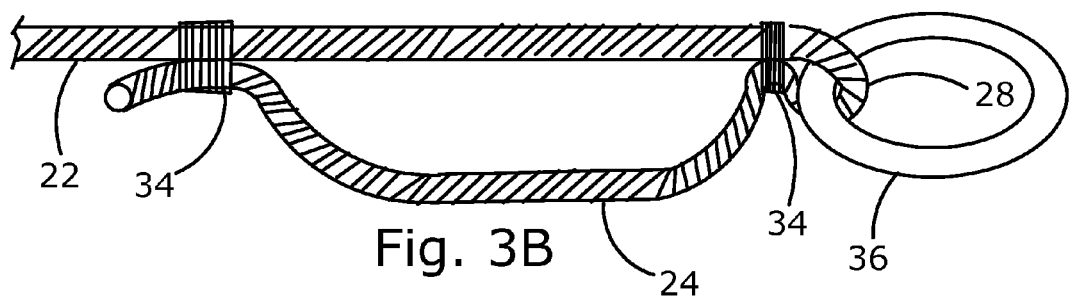
FIG. 3B is an enlarged side elevation view of the collar end of the convertible and size adaptable dog lead according to a second embodiment.

Referring now to FIG. 3B, the collar end of the present invention is illustrated in enlarged side elevation view according to a second preferred embodiment. Flexible cord 22 forms a main loop 24 at a distal end with a ring 36 engaged in an attachment loop 28. Main loop 24 and attachment loop 28 are formed with a first and second wrap 34. Ring 36 is preferably a cast metal or molded plastic solid ring. Ring 36 is intended to receive cord 22 in forming a collar, and loop 24 is intended to receive cord 22 to form a chest band as described above. Alternate forms of ring 36 and means of attachment in addition to attachment loop 28 are deemed to be within the scope of the present invention.

Figure 3C:
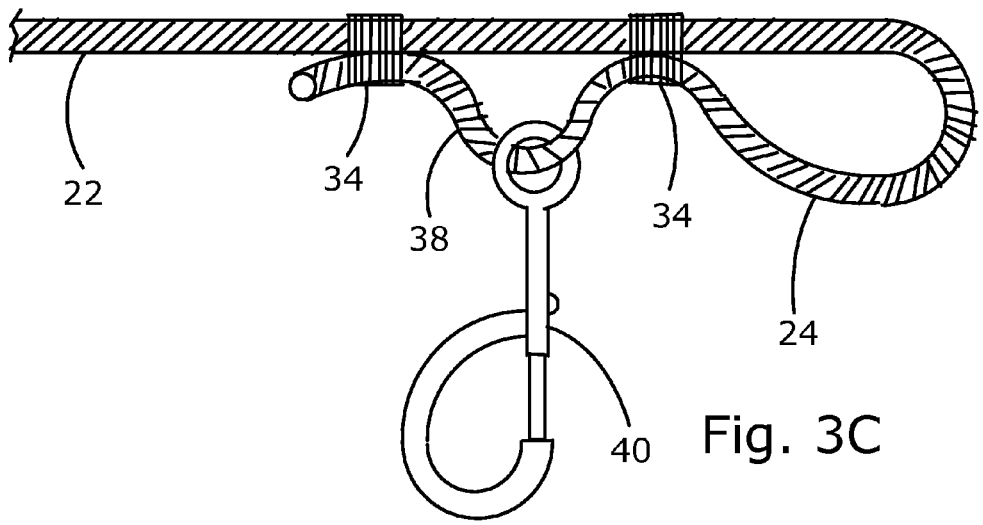
FIG. 3C is an enlarged side elevation view of the collar end of the convertible and size adaptable dog lead according to a third embodiment.

Referring now to FIG. 3C, the collar end of the present invention is illustrated in enlarged side elevation view according to a third preferred embodiment. Flexible cord 22 forms a first loop 24 at a distal end and a second loop 38 adjacent thereto. Second loop 38 is somewhat smaller than first loop 24. A snap connector 40 is engaged on second loop 38. First loop 24 is intended to receive cord 22 in forming a collar, and snap connector 40 is intended to receive cord 22 to form a chest band as described above. An advantage to use of a snap connector for holding cord 22 in forming a chest band is the speed and ease of engaging and disengaging cord 22.

Figure 4:
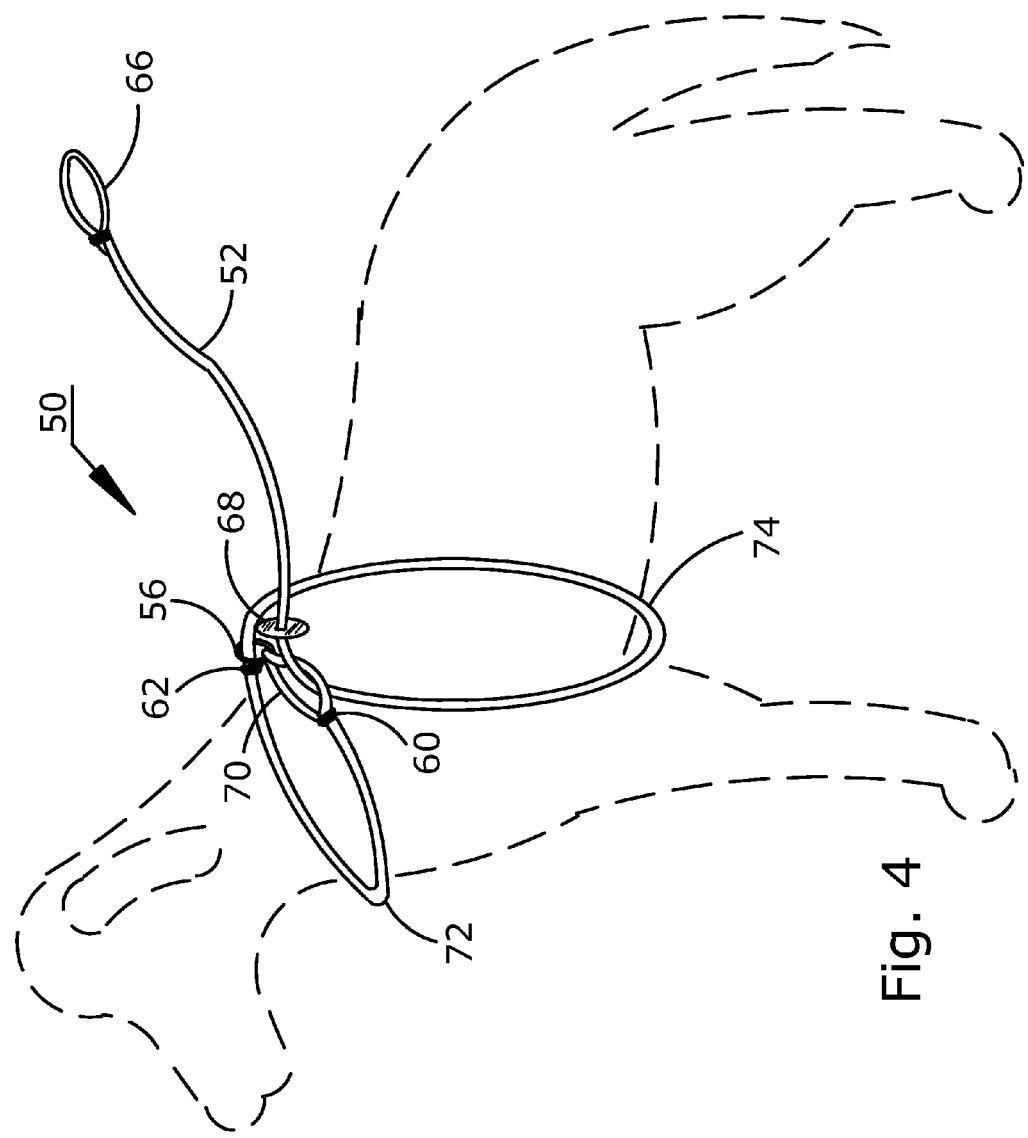
FIG. 4 is a perspective view of a convertible and size adaptable dog lead of the present invention worn by a dog according to a fourth embodiment, the dog shown in dashed lines for clarity.

Referring now to FIG. 4, a convertible and size adaptable dog lead 50 is shown according to a fourth preferred embodiment as placed around a dog, the dog being illustrated in dashed lines for clarity. Dog lead 50 is formed of a flexible cord 52 that terminates with a handle 66. A ring 56 is fixedly attached to the opposite end of cord 52. Cord 52 is passed through ring 56 to form a collar portion 72. A snugly moveable stop 62 in the form of a frictional wrap rides on collar portion 72. Stop 62 is snugly fitted to the cord forming collar portion 72 in a position below ring 56 to be snugly moveable along the cord according to the size of the dog to be exercised. In other words, stop 62 can be moved by hand pressure, but will not slide along collar portion 72 unless being pushed. The diameter of ring 56 is sized to not pass over stop 62, making stop 62 an adjustable minimum size control for collar portion 72. Cord 52 is passed through ring 56, handle 66 encircles cord 52 above ring 56, and stop 62 is positioned below ring 56, therefore ring 56 is substantially permanently captured and collar portion 72 is substantially permanently formed. Collar portion 72 will be fitted to be comfortable around the neck of the dog, while not permitted to become tight by the positioning of stop 62. A loop 70 is formed in cord 52 in the portion adjacent to ring 56 by wrap 60 in a manner described above in relation to FIG. 3B.

Referring further to FIG. 4, a washer 68 is provided on a portion of cord 52 beyond collar loop 72 and ring 56. Washer 68 is substantially planar with a central opening sized to fit snugly over cord 52. Washer 68 may be round, as illustrated, or another shape, e.g. hexagonal. After collar loop 72 is placed over the head and around the neck of the dog, handle 66 and cord 52 are passed under and around the chest of the dog and handle 66 is passed through loop 70 formed adjacent to ring 56. Washer 68 is twisted to be approximately parallel to cord 52 and present a substantially flat projection that is passed through loop 70. After passing through loop 70, washer 68 is released and returns to reside in substantially perpendicular orientation relative to cord 52. The diameter of washer 68 prevents washer 68 from passing accidentally through loop 70. According to the fourth preferred embodiment of the invention, washer 68 is formed from a resiliently flexible sheet material, e.g. neoprene rubber, on the order of $1/16^{th}$ inch thick. With washer 68 formed of a flexible sheet, washer 68 may be bent in half to be passed through loop 70, the natural resiliency keeping washer 68 from passing unintentionally through loop 70. With washer 68 passed through loop 70, the portion of cord 52 surrounding the dog's chest can be made tighter by the handler pulling on handle 66, but cannot become looser. In this manner, cord 52 remains fairly close to the chest of the dog, permitting proper control without constant pressure. As illustrated, cord 52 passes through loop 70 in the vicinity of the dog's withers, rather than on the dog's neck, further improving the general condition of control and comfort.

Continuing with FIG. 4, to remove harness lead 50 from the dog, washer 68 and handle 66 are passed back through loop 70. Next the portion of cord 52 is passed under the chest and collar loop 72 is slipped over the head. Harness lead 50 is easily adjusted in size to accommodate a different dog by sliding stop 62 to a different position.

The present invention convertible and size adaptable dog lead is preferably formed of a relatively flexible and soft cord. A braided cord, such as may be formed of nylon fiber and used in marine application has been found to be satisfactory. The softness and flexibility provides easy handling and comfort for both the dog and the dog walker.

Figure 5:
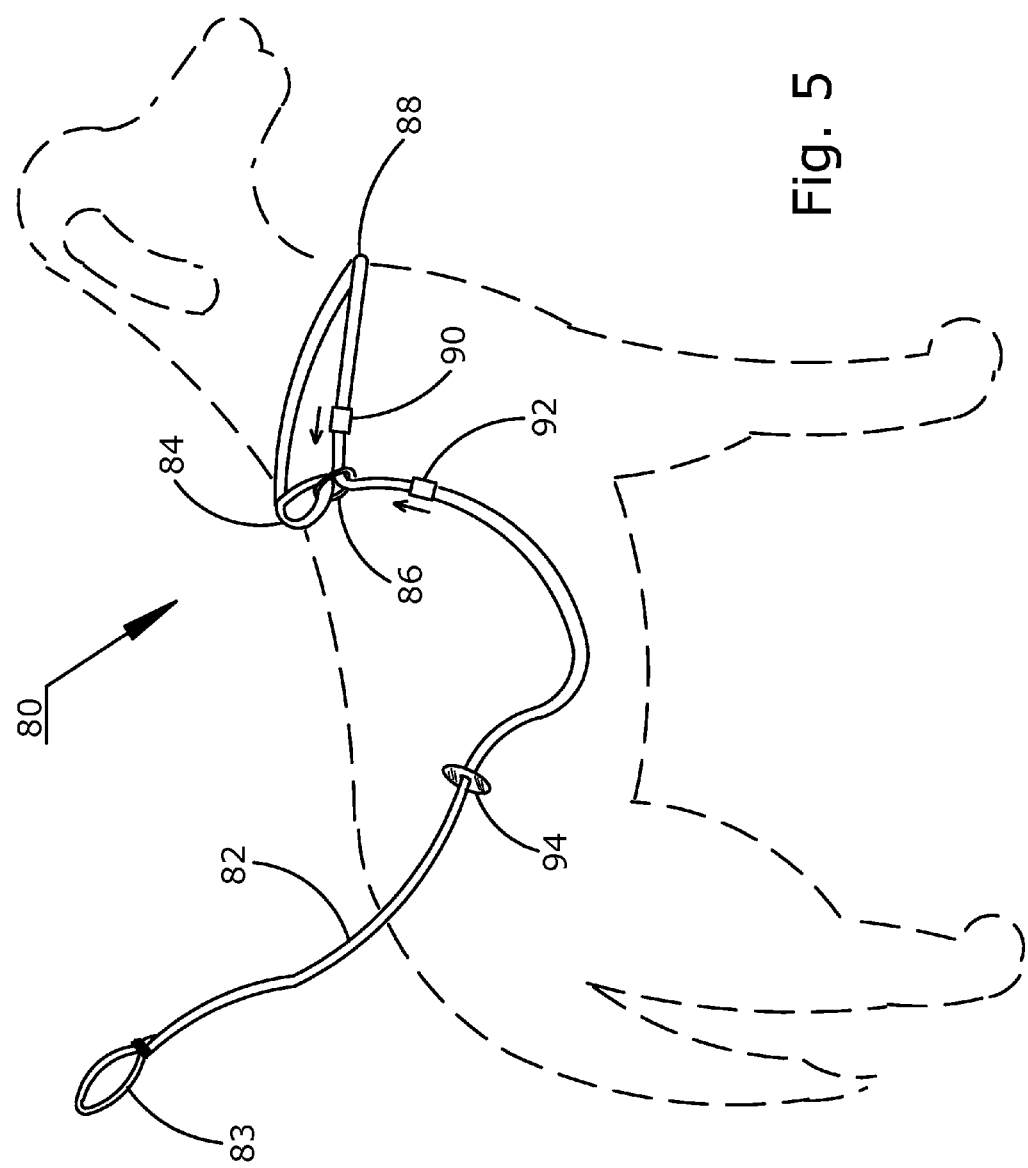
FIG. 5 is a perspective view of a convertible and size adaptable dog lead of the present invention in the first stage of being placed on a dog according to a fifth embodiment, the dog shown in dashed lines for clarity.

Referring now to FIG. 5, a fifth embodiment of the present invention is illustrated in perspective view in the first stage of being placed on a dog, the dog shown in dashed lines for clarity. Harness lead 80 is formed of a single length of flexible cord 82. A handle 83 is formed at a first end of cord 82 and a slit 84 is formed at a second end of cord 82. Handle 83 and slit 84 are created by any appropriate means, including stitching, interweaving or wrapping. Slit 84 is formed from a portion of cord 82 that is passed through and interlocks with a ring 86, similar to the construction shown in FIG. 3B. Ring 86 may be round or elliptical in shape and is preferably formed of a rigid material, e.g. metal or plastic. An inner stop 90 is snugly mounted onto cord 82 between ring 86 and slit 84. An outer stop 92 is snugly mounted onto cord 82 between ring 86 and handle 83. Inner stop 90 and outer stop 92 are in the form of tubes of a resilient resin with a relatively high coefficient of friction, e.g. silica gel. A washer 94 is snugly mounted onto cord 82 between outer stop 92 and handle 83. Washer 94 is made of a resilient sheet material, e.g. silica gel, of approximately $1/16^{th}$ inch in thickness. The diameter of washer 94 is sized to allow washer 94 to pass through slit 84 when washer 94 is folded, and to prevent washer 94 from passing through slit 84 when washer 94 is flat, i.e. perpendicular to the length of cord 82. Alternately, washer 94 may be in substantially planar condition and passed through slit 84 by pressing washer 94 close to the length of cord 82.

Referring further to FIG. 5, harness lead 80 is constructed by forming handle 83 and then passing flexible cord 82 sequentially through washer 94, outer stop 92, ring 86, inner stop 90 to terminate at slit 84 which also interlocks with ring 86, thereby forming a collar loop 88. As shown, collar loop 88 is placed over the head of the dog to rest low on the neck, slightly above the chest. Slit 84 is positioned to ride on the back of the dog, approximately between the shoulders, with ring 86 positioned on the dog's flank above the point where the rear line of the front leg joins the dog's body. Inner stop 90 and outer stop 92 may be moved to contact ring 86, holding ring 86 in the desired position.

Figure 6:
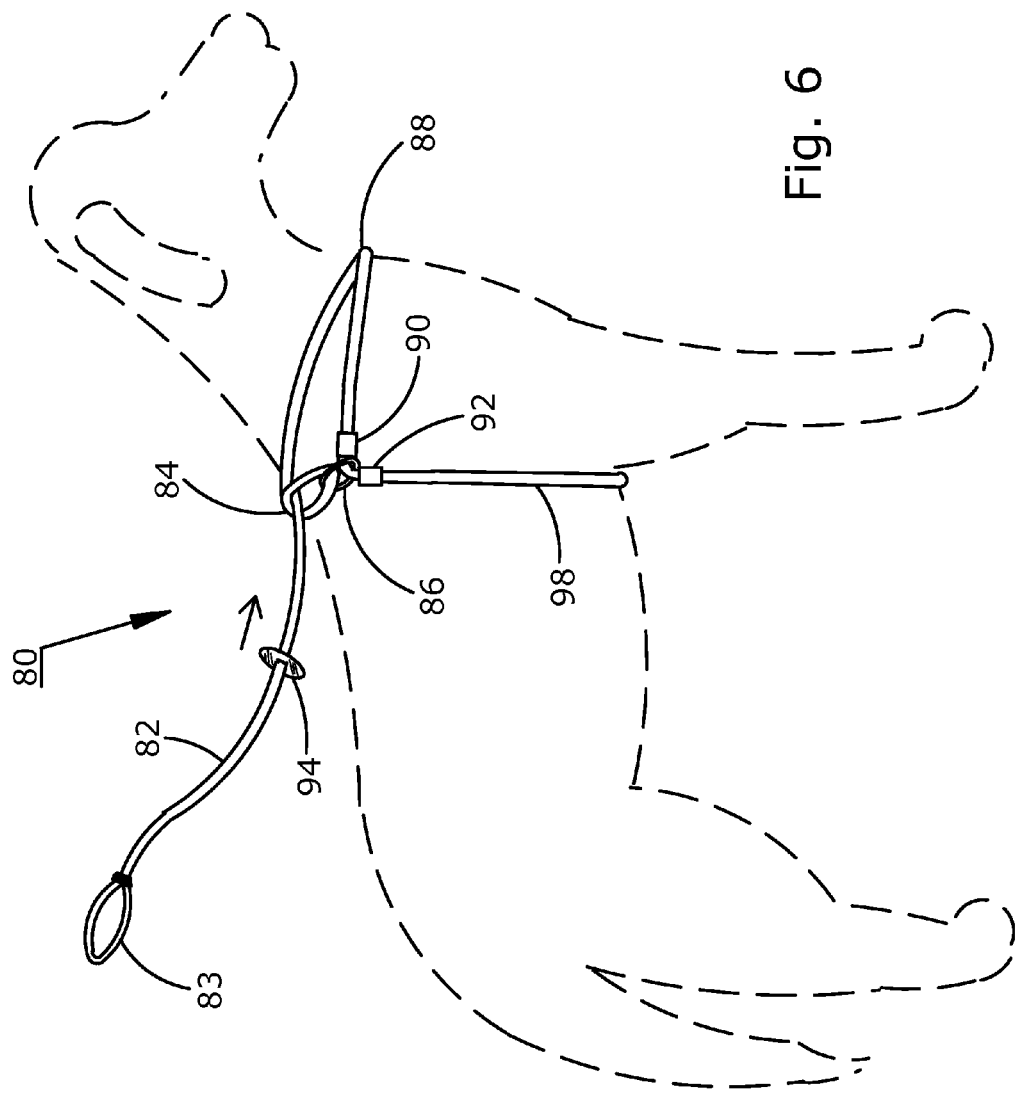
FIG. 6 is a perspective view of a convertible and size adaptable dog lead of the present invention in the second stage of being placed on a dog according to the fifth embodiment.

Referring now to FIG. 6, with collar loop 88 around the lower neck area of the dog, handle 83 and washer 94 are passed under the body of the dog on the near side and brought up the body of the dog on the far side to be passed through slit 84. A chest band 98 is thereby created to reside close behind the front legs of the dog. Inner stop 90 and outer stop 92 snugly engage cord 82 and are moved to be in close proximity or in contact with ring 86, therefore collar loop 88 can neither loosen or tighten around the neck of the dog. By this feature, a dog that is not accustomed to a lead or is anxious will be maintained under control without getting hurt by pulling. Washer 94 is next moved along cord 82 to be positioned in close proximity to slit 84.

Figure 7:
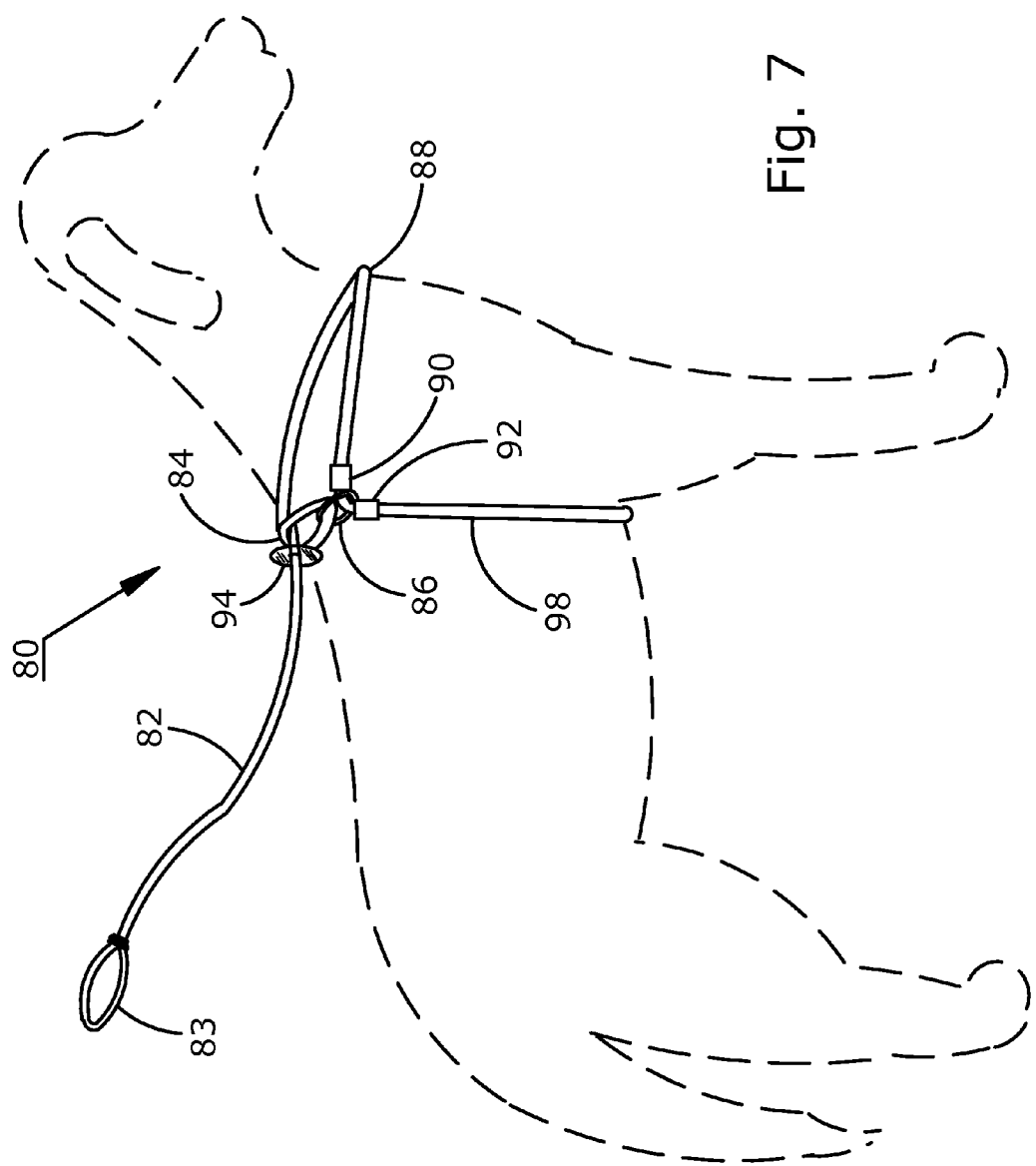
FIG. 7 is a perspective view of a convertible and size adaptable dog lead of the present invention being fully placed on a dog according to the fifth embodiment.

Referring now to FIG. 7, the dog lead 80 of the fifth embodiment is shown fully positioned on a dog. Collar loop 88 is held around the dog's neck in a manner to prevent loosening or tightening by the proximity of both inner stop 90 and outer stop 92 to ring 86. Handle 83 and washer 94 have been passed under the dog's chest and through slit 84 to form chest band 98 with washer 94 positioned against ring 86. In this manner, chest band 98 is restrained from becoming loose. If the dog or the dog handler pulls on dog lead 80, chest band 98 will tighten, affording gentle and secure control.

Referring further to FIG. 7, with collar loop 88 substantially fixed in size around the neck of the dog as adjusted by the dog handler, and chest band 98 prevented from becoming loose and allowed to become tight, the dog is virtually not able to escape from dog lead 80. In addition, removal of dog lead 80 from the dog involves passing washer 94 and handle 83 through slit 84 and passing collar loop 88 over the dog's head. There is no need to move inner stop 90 or outer stop 92 for the removal procedure.

While the description above discloses preferred embodiments of the present invention, it is contemplated that numerous variations and modifications of the invention are possible and are considered to be within the scope of the claims that follow.

What is claimed is:

1. A convertible and size adaptable dog lead, comprising:
   a. a single continuous flexible cord formed into a handle, a collar loop and a chest band;
   b. the handle formed at a first end of the cord;
   c. a slit formed at a second end of the cord;
   d. a ring interlocked with the slit;
   e. the handle and a first portion of the cord passed through the ring to form the collar loop, the collar loop configured for encircling a neck of a dog;
   f. an inner snugly moveable stop mounted on the collar loop, the inner stop sized to prevent passing through the ring for preventing the collar loop from becoming tight;
   g. an outer snugly moveable stop mounted on the cord between the collar loop and the handle, the outer stop sized to prevent passing through the ring for preventing the collar loop from becoming loose; and
   h. the chest band formed by a user of the dog lead passing the handle and a second portion of the cord transversely under the body of the dog and through the slit to position the chest band rearward of and adjacent to the dog's front legs.

2. The dog lead described in claim 1, further comprising a washer snugly mounted on the cord between the outer stop and the handle.

3. The dog lead described in claim 2, wherein the washer has an outside diameter sized to not pass through the slit when the washer is in a flat condition.

4. The dog lead described in claim 2, wherein the washer is formed of a resilient resin.

5. The dog lead described in claim 2, wherein the washer is sized to fit through the slit in a folded condition and not fit through the slit when in a flat condition and oriented perpendicular to the cord.

6. The dog lead described in claim 1, wherein the inner stop and the outer stop are tubular.

7. The dog lead described in claim 6, wherein the inner stop and the outer stop are formed of a resilient resin with a high coefficient of friction.

* * * * *